(12) United States Patent
Judd et al.

(10) Patent No.: US 10,798,033 B2
(45) Date of Patent: Oct. 6, 2020

(54) PROCESSING MESSAGES FOR AN APPLICATION RUNNING ON A COMPUTER EXTERNAL TO A COMMUNICATIONS MANAGEMENT UNIT (CMU)

(71) Applicant: Honeywell International Inc., Morris Plains, NJ (US)

(72) Inventors: Thomas D. Judd, Woodinville, WA (US); Thomas F. McGuffin, Bellevue, WA (US)

(73) Assignee: Honeywell International Inc., Morris Plains, NJ (US)

( * ) Notice: Subject to any disclaimer, the term of this patent is extended or adjusted under 35 U.S.C. 154(b) by 430 days.

(21) Appl. No.: 15/473,440

(22) Filed: Mar. 29, 2017

(65) Prior Publication Data

US 2018/0287971 A1 Oct. 4, 2018

(51) Int. Cl.
*H04B 7/185* (2006.01)
*H04L 12/58* (2006.01)
(Continued)

(52) U.S. Cl.
CPC .......... *H04L 51/046* (2013.01); *G06Q 10/10* (2013.01); *H04B 7/18506* (2013.01); *H04L 67/12* (2013.01); *H04L 69/08* (2013.01)

(58) Field of Classification Search
CPC ....... H04L 51/046; H04L 67/12; H04L 69/08; G06Q 10/10; H04B 7/18506
See application file for complete search history.

(56) References Cited

U.S. PATENT DOCUMENTS 7,512,714 B2 3/2009 Eckert
8,220,038 B1 * 7/2012 Lucchesi ............... H04L 63/105
726/4
(Continued)

FOREIGN PATENT DOCUMENTS

EP 0451897 10/1991
WO 2006026632 A1 3/2006
WO 2009148639 A2 12/2009

OTHER PUBLICATIONS

Mendez, "AMDA Report Learning Experience", Nov. 2011, pp. 1-18, Publisher: Avionics Maintenance Engineering.
(Continued)

*Primary Examiner* — Kamal B Divecha
*Assistant Examiner* — Sujana Khakural
(74) *Attorney, Agent, or Firm* — Fogg & Powers LLC

(57) ABSTRACT

A method for processing Aircraft Communications Addressing and Reporting System (ACARS) messages at a Communications Management Unit (CMU) on an aircraft is provided. The method includes, for an ACARS downlink message, receiving a message at the CMU from an application on a computer external to the CMU onboard the aircraft, reading a field in the message that indicates a message type for that application, determining an ACARS label associated with the message type, using the determined ACARS label instead of the industry standard ACARS label/sublabel associated with the onboard application external to the CMU, and sending the ACARS downlink message encoded with the determined ACARS label to a ground system to be delivered to a peer ground application.

20 Claims, 3 Drawing Sheets

(51) Int. Cl.
*G06Q 10/10* (2012.01)
*H04L 29/08* (2006.01)
*H04L 29/06* (2006.01)

(56) References Cited

U.S. PATENT DOCUMENTS

| | | | | |
|---|---|---|---|---|
| 8,332,133 B2* | 12/2012 | Ferro | ............... | G08G 5/0013 |
| | | | | 701/120 |
| 2003/0030581 A1* | 2/2003 | Roy | ............... | H04L 9/0841 |
| | | | | 342/36 |
| 2005/0181787 A1* | 8/2005 | Judd | ............... | H04L 29/06 |
| | | | | 455/431 |
| 2006/0080451 A1* | 4/2006 | Eckert | ............... | G06F 9/544 |
| | | | | 709/230 |
| 2007/0255850 A1* | 11/2007 | Gould | ............... | H04L 67/325 |
| | | | | 709/240 |
| 2011/0176617 A1* | 7/2011 | Fagan | ............... | G06F 9/546 |
| | | | | 375/259 |
| 2013/0028174 A1* | 1/2013 | Cabos | ............... | H04L 51/063 |
| | | | | 370/316 |
| 2016/0134682 A1* | 5/2016 | Bolling | ............... | H03M 7/30 |
| | | | | 709/217 |
| 2017/0063529 A1* | 3/2017 | Nguyen | ............... | H04W 12/10 |
| 2017/0236425 A1* | 8/2017 | Ballestros | ............... | G08G 5/0008 |
| | | | | 342/32 |

OTHER PUBLICATIONS

Honeywell, "Mark II CMU & ATSU AOC ART Reconfiguration Tool", , pp. 1-3, Publisher: Honeywell International Inc.
Honeywell, "Boeing 787 Ground Based Software Tool Communication Management Function", Pub No. UM2001F-15005, Part No. PS4092978, Dated May 16, 2013.
European Patent Office, "Extended European Search Report from EP Application No. 18162982.5 dated Aug. 29, 2018", "from Foreign Counterpart of U.S. Appl. No. 15/473,440", dated Aug. 29, 2018, p. 1-7, Published in: EP.

* cited by examiner

PROCESSING MESSAGES FOR AN APPLICATION RUNNING ON A COMPUTER EXTERNAL TO A COMMUNICATIONS MANAGEMENT UNIT (CMU)

BACKGROUND

Many Aircraft include a Communication Management Unit (CMU) or a Communication Management Function (CMF). For simplicity, this specification will use the term CMU as generic for both CMU and CMF. In existing systems, the CMU includes a configurable Aircraft Operations Communication (AOC) application. Those skilled in the art also use the acronym AOC to indicate Airline Operations Control. The configurable AOC allows the operator to customize many features of the AOC; such as format messages; determine whether to display the message on a display; customize the display of messages on a display; determine when to send a message (e.g., automatically send or send upon receiving input from a pilot or other user); determine what data, if any, available in the CMU should be incorporated into the message. Other configurable functions are available in the AOC as is known to one skilled in the art.

The operator defines the configurable AOC application within the CMU with a loadable file such as an Aircraft Operations Communication (AOC) database (DB), Airline Modifiable Information (AMI), or the like. For simplicity, this specification will use the term AOC as generic for both AOC and AMI databases. The AOC database includes information used to select the various configurable options within the AOC such as: formatting and display of various uplink messages; formatting and display of various downlink message; the display of the pages and logic used to create the downlink messages; formats for printing uplink messages; and/or the logic behind the messages and display/HMI functions. Other information is included in the AOC database as is known to one skilled in the art.

In addition to the CMU, other computers are located on-board the aircraft. For example, electronic flight bags (EFBs) may be used for some cockpit operations. An EFB may be brought onto the aircraft by a pilot or other crew member or the EFB may already be installed in the aircraft. In the past, EFBs were portable or fixed personal computers (PC). Now EFBs are personal devices, such as iPads or other types of personal tablets. Other computers on-board the aircraft include line replaceable units (LRUs), maintenance terminals, PADs, personal devices and other cabin terminals.

Traditionally, messages are communicated between applications running on the CMU and ground systems associated with the airline operating the aircraft. These messages typically include a label that depends on the specific application that generated the message. When received at the ground system, the label of the message is used by the operator to route the message to the appropriate ground application. Messages that originate from applications running on other computers on the aircraft use the label/sublabel (rather than label) in a different way. For these messages, the label/sublabel is used to indicate the computer or line replaceable (LRU), rather than the application, that originated the message.

As operators continue to modernize their fleets, there is a trend to move applications traditionally run on the CMU to other computers on the aircraft. Due to the size of these fleets, not all aircraft are upgraded at the same time. While these modernization efforts are in process, messages from the same application on different aircraft would need to be handled differently by the operator's ground-based systems. In aircraft that have been updated (e.g., applications have been moved to other computers on the aircraft), the traditional label could not be used by the ground system (e.g., ground stations, datalink service provider and operations center that hosts the ground applications) to route the message to the correct ground application. Rather than indicating the type of message, the label/sublabel indicate the computer on the aircraft that generated the message. To properly handle messages received at the ground system, the operator would need to know which configuration was used by the aircraft that generated the message and the message type so that the message could be routed to the appropriate ground application.

For the reasons stated above and for other reasons stated below which will become apparent to those skilled in the art upon reading and understanding the specification, there is a need in the art for a process for handling messages for AOC applications that is independent of the computer running the AOC application on the aircraft.

SUMMARY

A method for processing Aircraft Communications Addressing and Reporting System (ACARS) messages at a Communications Management Unit (CMU) on an aircraft is provided. The method includes, for an ACARS downlink message, receiving a message at the CMU from an application on a computer external to the CMU onboard the aircraft, reading a field in the message that indicates a message type for that application, determining an ACARS label associated with the message type, using the determined ACARS label instead of the industry standard ACARS label/sublabel associated with the onboard application external to the CMU, and sending the ACARS downlink message encoded with the determined ACARS label to a ground system to be delivered to a peer ground application.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide a process for handling messages for Aircraft Operations Communication (AOC) applications that is independent of the computer running the AOC application on the aircraft. In embodiments of the invention, this is accomplished by a function resident on the Communications Management Unit (CMU) that makes downlink messages from AOC applications appear to have originated from an application running on the CMU even if the AOC application is running on another computer on the aircraft. In one embodiment, the function selects a label for the downlink message based on the message type rather than a label/sublabel that identifies the computer that originated the message as would be standard operating procedure for Aircraft Communications Addressing and Reporting System (ACARS) messages. Similarly, the function running on the CMU modifies uplink messages received for an AOC application running on a different computer (e.g., a computer other than the CMU), to include an indication of the message type of the message so that the application running on the other computer may treat the message the same as if the AOC application were running on the CMU.

Figure 1:
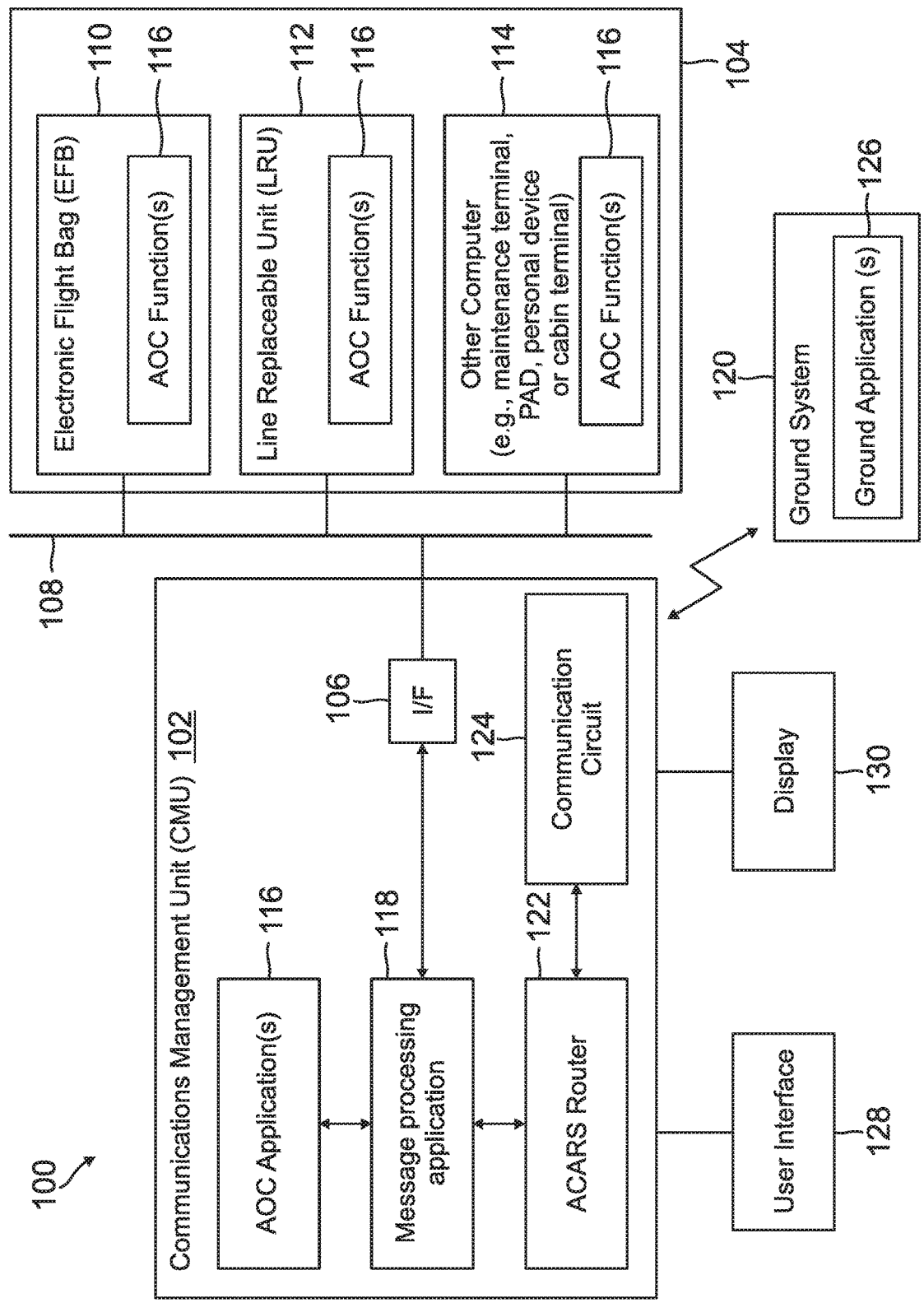
FIG. 1 is a block diagram of one embodiment of a system with a communications management unit (CMU) that is configurable to interface with a number of different computers on-board an aircraft, each of which is configurable to run an Aircraft Operations Communication (AOC) application.

FIG. 1 is a block diagram of one embodiment of a system, indicated generally at 100, with a communications management unit (CMU) 102 that is configurable to interface with a number of different computers 104 on-board an aircraft. Each of the computers 104 is configurable to run an Aircraft Operations Communication (AOC) application. The system 100 uses, for example, the methods described below with respect to FIGS. 2 and 3 to process downlink and uplink messages for AOC applications running on computers on the aircraft.

The CMU 102 includes an interface (I/F) 106 that provides a port for passing messages between the CMU and the computers 104. In one embodiment, the interface 106 is coupled to a communication bus 108, e.g., an ARINC 429 bus using an ARINC 619 protocol. The computers 104 are also coupled to the communication bus 108. In some embodiments, the computers 104 include one or more of Electronic Flight bags (EFB) 110, Line Replaceable Units 112, and other computers 114, such as maintenance terminals, PADs, personal devices, or cabin terminals. Each of these computers is configurable to run one or more AOC applications or functions 116. These AOC functions are traditionally run on the CMU 102. Moving the AOC functions to the computers 104 can cause a problem with messaging due to the standard way that messages from computers other than the CMU are handled when communicating with a ground system as discussed above.

Figure 2:
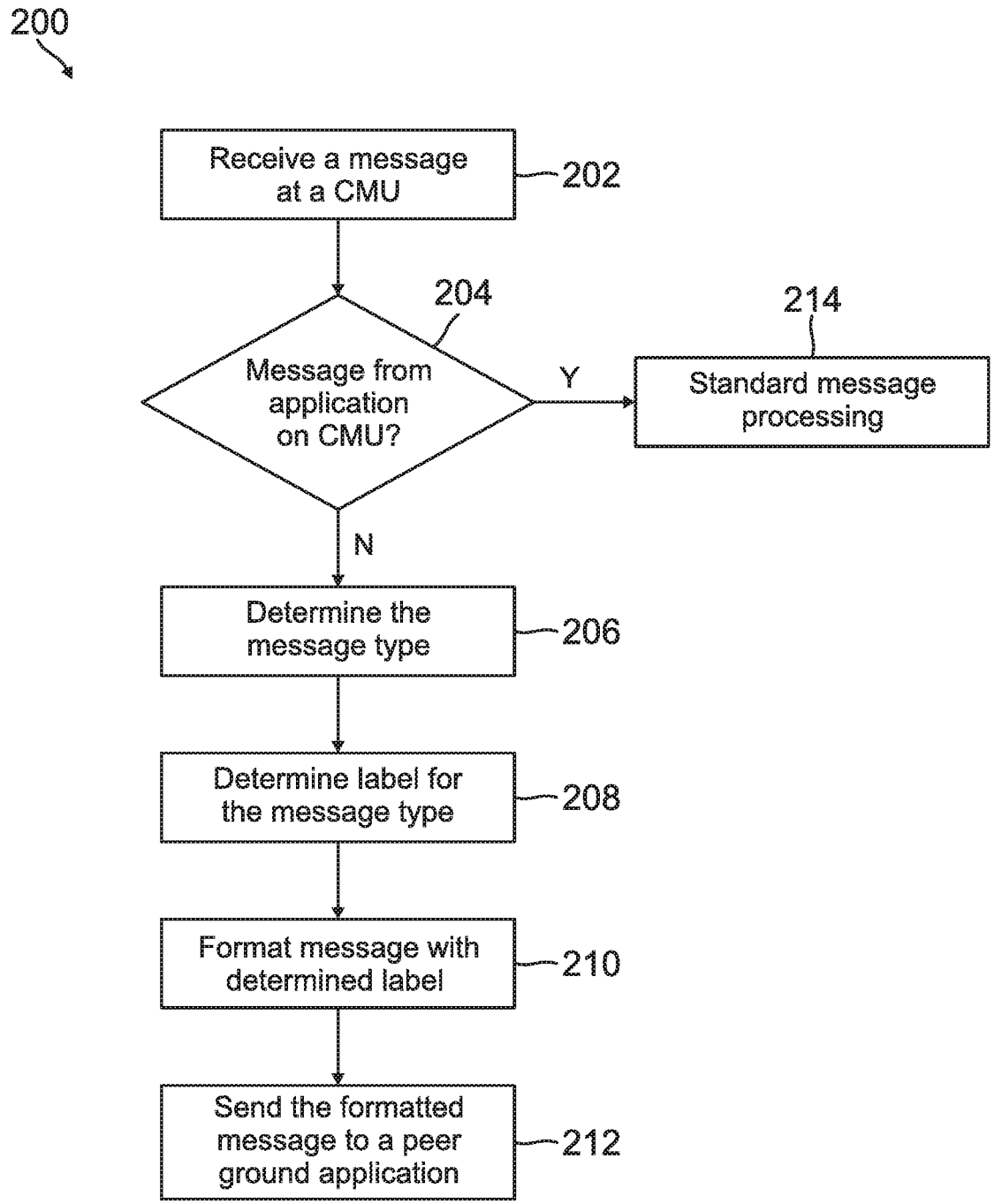
FIG. 2 is a flow chart of one embodiment of a method for processing downlink messages from an Aircraft Operations Communication (AOC) application running on a communications management unit (CMU) or a computer external to the CMU.
Figure 3:
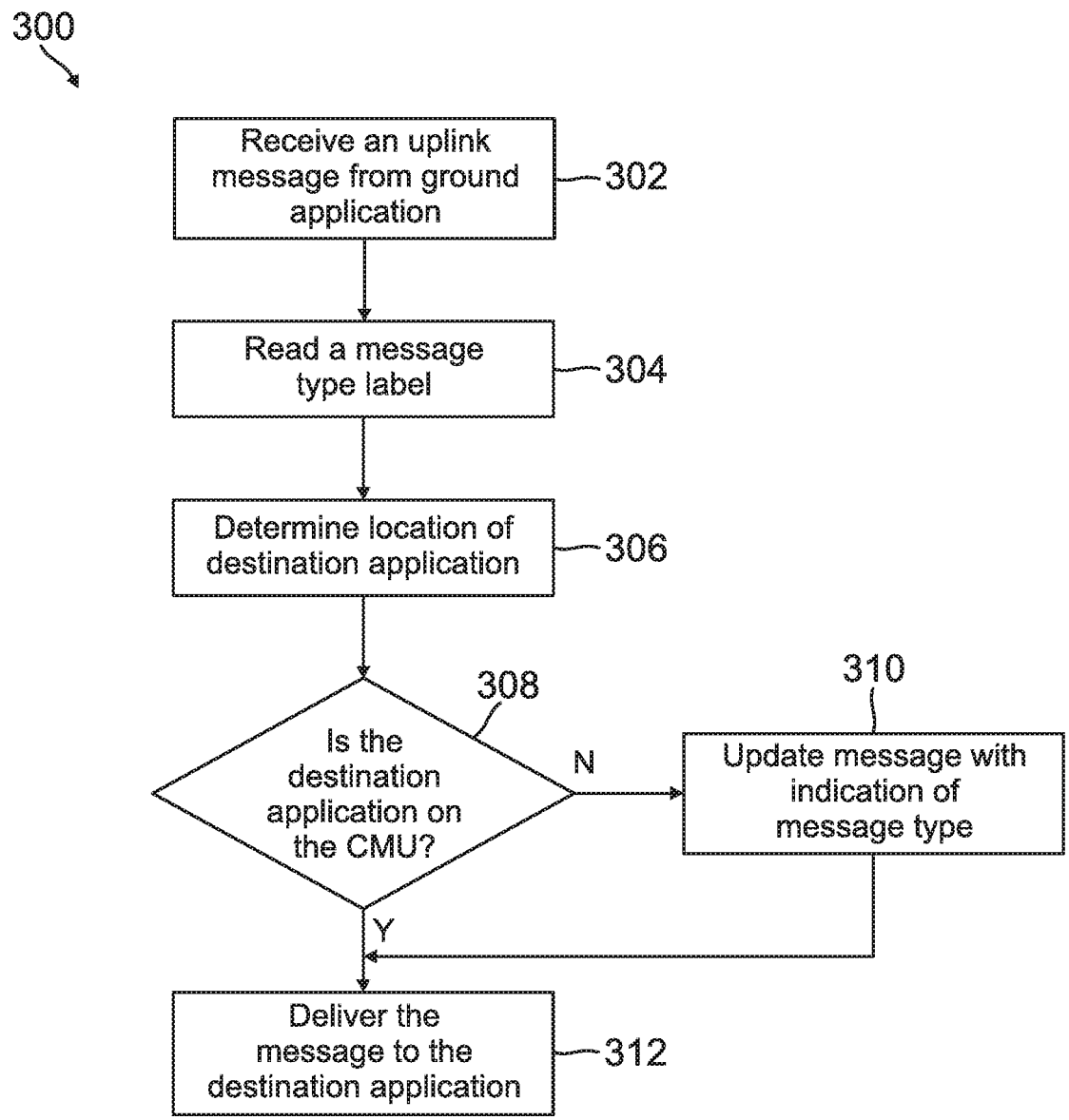
FIG. 3 is a flow chart of one embodiment of a method for processing uplink messages from a ground application that is destined for an Aircraft Operations Communication (AOC) application running on either the CMU or another computer on the aircraft.

To overcome this problem, the CMU 102 incorporates a message processing function or application 118 that, in one embodiment, implements the processes of FIGS. 2 and 3 for handling downlink and uplink messages, respectively. The CMU 102 communicates with a ground system 120 via an ACARS router 122 and a communication circuit 124. The communication circuit 124 communicates with the ground system 120 over ACARS communication links which can include VHF, HF, WiFi, cellular or SATCOM communication links. The ground system 120 includes one or more ground applications 126 that each have a peer AOC application running on the CMU 102 or one of the computers 104.

The CMU 102 also interfaces and uses a user interface 128 and a display 130 as is known to one of ordinary skill in the art.

In operation, the message processing application 118 processes uplink and downlink messages for the AOC applications 116 whether they are running on the CMU 102 or one of the computers 104. If the AOC application 116 is running on one of the other computers 104, the message processing application 118 handles downlink messages by using a label associated with the message-type of the CMU downlink message rather than the industry standard label/sublabel for a message for a computer other than the CMU. In this way, the ground application 126 will be able to handle the downlink message as if it were received from an AOC application 116 running on the CMU 102. Advantageously, the modification of downlink messages by the message processing application 118 allows an operator to have messages handled appropriately by its ground application without having to track which configuration of AOC applications is on each of the aircraft in its fleet. The process implemented by the message processing application 118 makes the downlink messages all look like they come from AOC applications running on the CMU.

In the uplink, the message processing application 118 embeds an indication of the message type (derived from the label of the received uplink and optionally additional data from the uplink message like MFI, report code or other type identifier) into an uplink message that is destined for an AOC application 116 running on one of the computers 104. This way, the AOC application 116 will know what type of message is being received and will thus be able to handle it accordingly. Again, the AOC applications 116 are able to process the uplink messages correctly whether running on the CMU or another computer due to the processing of the message processing application 118. The operator does not have to know the configuration of the aircraft receiving the message for it to be handled correctly.

Downlink and uplink messages for the AOC applications 116 running on the CMU 102 are handled using the normal protocol by message processing application 118.

FIG. 2 is a flow chart of one embodiment of a method, indicated generally at 200, for processing downlink messages from an Aircraft Operations Communication (AOC) application running on a communications management unit (CMU) or a computer external to the CMU. The method 200 begins at block 202 when a downlink message is received at the CMU from an AOC application. At block 204, the process determines whether the downlink message is from an AOC application running on the CMU. If so, method 200 uses standard message processing (applying label) at block 214.

If the downlink message is received from an AOC application running on another computer, e.g., an electronic flight bag, line replaceable unit, maintenance terminal, PAD, personal device or cabin terminal or other computer on the aircraft, method 200 proceeds to block 206 and determines the message type. For example, the message type may be standard messages to the airline operations center such as weather updates, free text messages, out, on, off and in. At block 208, method 200 determines a label associated with the message type. For example, each of these messages has a standard label, e.g., weather related messages may be designated with a label of "10," free text messages may be designated by the label "20" and out, on, off and in may be designated by labels 30, 31, 32, and 33, respectively. At block 210, the downlink message is formatted with the determined label, e.g., the label field in the message header is modified and the message CRC is updated rather than using the label/sublabel associated with the other computer. Finally, at block 212, method 200 sends the formatted message to the peer ground application associated with the originating AOC application on the on-board computer.

FIG. 3 is a flow chart of one embodiment of a method, indicated generally at 300, for processing uplink messages from a ground application that is destined for an Aircraft Operations Communication (AOC) application running on either the CMU or another computer on the aircraft. Method 300 begins at block 302 when an uplink message is received at the CMU from a ground application. The CMU reads the message-type label at block 304. This message type label is in the header of the message as is standard practice for ACARS messages. Advantageously, the ground application does not need to know the computer on the aircraft that is running the corresponding AOC application. The ground application simply uses the standard ACARS protocol and labels the message as if the AOC application is running on the CMU. Examples of the labels are the same as given above with respect to the downlink messages.

Once the message type has been determined, method 300 proceeds to block 306 and determines the location of the destination application on the aircraft. For example, the destination AOC application could be on the CMU or it could be on any other appropriate computer, e.g., maintenance terminal, PAD, personal device, cabin terminal, line replaceable unit or electronic flight bag on-board the aircraft. At block 308, the process determines whether the location of the AOC application is on the CMU. If so, the process delivers the uplink message to the destination application at block 312. If the destination AOC application is not running on the CMU, the method 300 continues to block 310 and updates the message with an indication of the type of message. For example, in one embodiment, the message type is written into the Message Function Indicator (MFI) field of the message. Alternatively, the message type may be indicated using a pair of characters in the data field of the message. This indication of the message type will allow the AOC application on the other computer to be able to identify the type of message that is being received. The modified message is then delivered to the destination AOC application at block 312.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs) or Field Programmable Gate Arrays (FGPAs).

EXAMPLE EMBODIMENTS

Example 1 includes a method for processing Aircraft Communications Addressing and Reporting System (ACARS) messages at a Communications Management Unit (CMU) on an aircraft, the method comprising: for an ACARS downlink message: receiving a message at the CMU from an application on a computer external to the CMU onboard the aircraft; reading a field in the message that indicates a message type for that application; determining an ACARS label associated with the message type; using the determined ACARS label instead of the industry standard ACARS label/sublabel associated with the onboard application external to the CMU; and sending the ACARS downlink message encoded with the determined ACARS label to a ground system to be delivered to a peer ground application.

Example 2 includes the method of Example 1, wherein reading a field comprises reading a message function indicator (MFI) field.

Example 3 includes the method of any of Examples 1-2, wherein reading a field comprises reading characters in selected positions in a data field of the message.

Example 4 includes the method of any of Examples 1-3, wherein receiving a message at the CMU from an application on a computer external to the CMU onboard the aircraft comprises receiving a message from one of an electronic flight bag (EFB), line replaceable unit (LRU), maintenance terminal, PAD, personal device or cabin terminal running an application that is configured to communicate with a corresponding, peer ground application.

Example 5 includes the method of any of Examples 1-4, wherein determining an ACARS label comprises determining the ACARS label that would be used with the message if the corresponding application were running on the CMU.

Example 6 includes the method of any of Examples 1-5, and further comprising, for an ACARS uplink message: receiving an ACARS message at the CMU via a ground system from a ground application; reading an ACARS label of the ACARS message that indicates the message type; determining whether a destination application is resident in the CMU or other computer onboard the aircraft based on the message type; formatting the ACARS uplink message based on the location of the destination application: CMU or other computer on the aircraft; when the ACARS uplink message is intended for other computer on the aircraft, updating a field indicating the message type in the formatted message; and delivering the updated ACARS uplink message to the destination application onboard the aircraft.

Example 7 includes the method of Example 6, wherein updating the field comprises updating a message function indicator (MFI) field in the formatted message.

Example 8 includes the method of any of Examples 6-7, wherein updating the field comprises updating characters in selected positions in a data field of the message.

Example 9 includes a communications management unit (CMU) for an aircraft, the CMU comprising: an interface to one or more computers; an Aircraft Communications Addressing and Reporting System (ACARS) router; a communication circuit, coupled to the ACARS router, and configured to communicate ACARS messages with a ground system; a message processing application, wherein the message processing application is configured to use an ACARS label associated with a message type of a message received over the interface when downlinking messages via the ACARS router and the communication circuit; and wherein the message processing application is configured to update a message type field in an uplink message received from the communication circuit and the ACARS router when the message is destined for a computer other than the CMU.

Example 10 includes the communication management unit of Example 9, wherein the interface comprises a bus that interfaces to one or more of an electronic flight bag (EFB), line replaceable unit (LRU), maintenance terminal, PAD, personal device, cabin terminal or other computer running an AOC application.

Example 11 includes the communication management unit of any of Examples 9-10, wherein the message processing application is configured to read a message function indicator (MFI) field to determine the message type of the message received over the interface.

Example 12 includes the communication management unit of any of Examples 9-11, wherein the message processing application is configured to read characters in selected positions in a data field of the message to determine the message type of the message received over the interface.

Example 13 includes the communication management unit of any of Examples 9-12, wherein the message processing application is configured to determine the ACARS label that would be used with the message if the corresponding application were running on the CMU.

Example 14 includes the communication management unit of any of Examples 9-13, wherein the message processing application is configured to update a message function indicator (MFI) field in the uplink message.

Example 15 includes the communication management unit of any of Examples 9-14, wherein the message processing application is configured to update characters in selected positions in a data field of the uplink message.

Example 16 includes a computer program product comprising program instructions embodied on a non-transitory storage medium to process Aircraft Communications Addressing and Reporting System (ACARS) messages at a Communications Management Unit (CMU) on an aircraft, the instructions being operable to cause a processor to: for an ACARS downlink message: receive a message at the CMU from an application on a computer external to the CMU onboard the aircraft; read a field in the message that indicates a message type for that application; determine an ACARS label associated with the message type; use the determined ACARS label instead of the industry standard ACARS label/sublabel associated with the onboard application external to the CMU; send the ACARS downlink message encoded with the determined ACARS label to a ground system to be delivered to a peer ground application.

Example 17 includes the computer program product of Example 16, wherein causing the processor to receive a message at the CMU from an application on a computer external to the CMU onboard the aircraft comprises causing the processor to receive a message from one of an electronic flight bag (EFB), line replaceable unit (LRU), maintenance terminal, PAD, personal device or cabin terminal running an application that is configured to communicate with a corresponding, peer ground application.

Example 18 includes the computer program product of any of Examples 16-17, wherein causing a processor to determine an ACARS label comprises causing a processor to determine the ACARS label that would be used with the message if the corresponding application were running on the CMU.

Example 19. The computer program product of any of Examples 16-18, and further comprising, for an ACARS uplink message, causing the processor to: receive an ACARS message at the CMU via a ground system from a ground application; read an ACARS label of the ACARS message that indicates the message type; determine whether a destination application is resident in the CMU or other computer onboard the aircraft based on the message type; format the ACARS uplink message based on the location of the destination application: CMU or other computer on the aircraft; when the ACARS uplink message is intended for other computer on the aircraft, update a field indicating the message type in the formatted message; and deliver the updated ACARS uplink message to the destination application onboard the aircraft.

Example 20 includes the computer program product of Example 19, wherein causing the processor to update the field comprises causing the processor to update one of (1) a message function indicator (MFI) field or (2) characters in selected positions in a data field of the formatted message.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:
1. A method for processing Aircraft Communications Addressing and Reporting System (ACARS) downlink and uplink messages at a Communications Management Unit (CMU) on an aircraft independent of a computer running Aircraft Operations Communication (AOC) applications, the method comprising:
   for the ACARS downlink message:
      receiving the ACARS downlink message at a message processing application executing on the CMU from the AOC application on the computer external to the CMU onboard the aircraft;
      reading, by the message processing application, a field in the ACARS downlink message that indicates a message type for the application which originated the ACARS downlink message;
      determining, by the message processing application, an ACARS label associated with the message type, wherein the determined ACARS label is one of a predetermined standard label designated for a message type for each type of AOC applications running on one or more external computers to the CMU;
      using the determined ACARS label instead of an industry standard ACARS label/sublabel associated with the AOC application external to the CMU, wherein the determined ACARS label makes the ACARS downlink message appear to have originated at the CMU; and
      sending, by the message processing application, the ACARS downlink message modified with the determined ACARS label to a ground system to be delivered to an appropriate peer ground application without having to track which configuration of AOC applications is on each of the aircraft,
wherein the industry standard ACARS label/sublabel identifies a computer that originated the ACARS downlink message rather than the AOC application that originated the ACARS downlink message and the predetermined standard labels identifies a type of the AOC application that originated the ACARS downlink message.

2. The method of claim 1, wherein reading a field comprises reading a message function indicator (MFI) field.

3. The method of claim 1, wherein reading a field comprises reading characters in selected positions in a data field of the ACARS downlink message.

4. The method of claim 1, wherein receiving the ACARS downlink message at the CMU from the AOC application on the computer external to the CMU onboard the aircraft comprises receiving the ACARS downlink message from one of an electronic flight bag (EFB), line replaceable unit (LRU), maintenance terminal, PAD, personal device or cabin terminal running an application that is configured to communicate with a corresponding, peer ground application.

5. The method of claim 1, wherein determining an ACARS label comprises determining the ACARS label that would be used with the ACARS downlink message if the corresponding AOC application were running on the CMU.

6. The method of claim 1, and further comprising, for the ACARS uplink message:
receiving the ACARS uplink message at the CMU via a ground system from a ground application;
reading an ACARS label of the ACARS uplink message that indicates the message type;
determining whether a destination application is resident in the CMU or other computer onboard the aircraft based on the message type;
formatting the ACARS uplink message based on the location of the destination application: CMU or other computer on the aircraft;
when the ACARS uplink message is intended for other computer on the aircraft, updating a field indicating the message type in the formatted ACARS uplink message; and
delivering the updated ACARS uplink message to the destination application onboard the aircraft.

7. The method of claim 6, wherein updating the field comprises updating a message function indicator (MFI) field in the formatted ACARS uplink message.

8. The method of claim 6, wherein updating the field comprises updating characters in selected positions in a data field of the ACARS uplink message.

9. A communications management unit (CMU) for an aircraft, the CMU comprising:
an interface to one or more computers external to the CMU onboard the aircraft;
an Aircraft Communications Addressing and Reporting System (ACARS) router;
a communication circuit, coupled to the ACARS router, and configured to communicate ACARS downlink and uplink messages with a ground system;
a message processing application executing on the CMU independent of the one or more computer running Aircraft Operations Communication (AOC) applications,
wherein the message processing application is configured to use a determined ACARS label associated with a message type of a received ACARS downlink message instead of an industry standard ACARS label/sublabel associated with the AOC application external to the CMU, wherein the determined ACARS label is one of a predetermined standard label designated for a message type for each type of AOC applications running on one or more external computers to the CMU, wherein the determined ACARS label makes the ACARS downlink message appear to have originated at the CMU, the ACARS downlink message received over the interface when downlinking messages via the ACARS router and the communication circuit to a ground system to be delivered to an appropriate peer ground application without having to track which configuration of AOC applications is on each of the aircraft, wherein the industry standard ACARS label/sublabel identifies a computer that originated the ACARS downlink message rather than the AOC application that originated the ACARS downlink message and the predetermined standard labels identifies a type of the AOC application that originated the ACARS downlink message; and
wherein the message processing application is configured to update a message type field in an ACARS uplink message received from the communication circuit and the ACARS router when the ACARS uplink message is destined for one of the one or more computers other than the CMU.

10. The communication management unit of claim 9, wherein the interface comprises a bus that interfaces to one or more of an electronic flight bag (EFB), line replaceable unit (LRU), maintenance terminal, PAD, personal device, cabin terminal or other computer running an AOC application.

11. The communication management unit of claim 9, wherein the message processing application is configured to read a message function indicator (MFI) field to determine the message type of the ACARS downlink message received over the interface.

12. The communication management unit of claim 9, wherein the message processing application is configured to read characters in selected positions in a data field of the ACARS downlink message to determine the message type of the ACARS downlink message received over the interface.

13. The communication management unit of claim 9, wherein the message processing application is configured to determine the ACARS label that would be used with the ACARS downlink message if the corresponding AOC application were running on the CMU.

14. The communication management unit of claim 9, wherein the message processing application is configured to update a message function indicator (MFI) field in the ACARS uplink message.

15. The communication management unit of claim 9, wherein the message processing application is configured to update characters in selected positions in a data field of the ACARS uplink message.

16. A computer program product comprising program instructions embodied on a non-transitory storage medium to process Aircraft Communications Addressing and Reporting System (ACARS) downlink and uplink messages at a Communications Management Unit (CMU) on an aircraft independent of a computer running Aircraft Operations Communication (AOC) applications, the instructions being operable to cause a processor to:
for the ACARS downlink message:
receive the ACARS downlink message at a message processing application executing on the CMU from the AOC application on the computer external to the CMU onboard the aircraft;

read, by the message processing application, a field in the ACARS downlink message that indicates a message type for the application which originated the ACARS downlink message;

determine, by the message processing application, an ACARS label associated with the message type, wherein the determined ACARS label is one of a predetermined standard label designated for a message type for each type of AOC applications running on one or more external computers to the CMU;

use the determined ACARS label instead of an industry standard ACARS label/sublabel associated with the AOC application external to the CMU, wherein the determined ACARS label makes the ACARS downlink message appear to have originated at the CMU;

send, by the message processing application, the ACARS downlink message modified with the determined ACARS label to a ground system to be delivered to an appropriate peer ground application without having to track which configuration of AOC applications is on each of the aircraft, wherein the industry standard ACARS label/sublabel identifies a computer that originated the ACARS downlink message rather than the AOC application that originated the ACARS downlink message and the predetermined standard labels identifies a type of the AOC application that originated the ACARS downlink message.

17. The computer program product of claim 16, wherein causing the processor to receive the ACARS downlink message at the CMU from the AOC application on the computer external to the CMU onboard the aircraft comprises causing the processor to receive the ACARS downlink message from one of an electronic flight bag (EFB), line replaceable unit (LRU), maintenance terminal, PAD, personal device or cabin terminal running an application that is configured to communicate with a corresponding, peer ground application.

18. The computer program product of claim 16, wherein causing a processor to determine an ACARS label comprises causing a processor to determine the ACARS label that would be used with the ACARS downlink message if the corresponding AOC application were running on the CMU.

19. The computer program product of claim 16, and further comprising, for the ACARS uplink message, causing the processor to:

receive the ACARS uplink message at the CMU via a ground system from a ground application;

read an ACARS label of the ACARS uplink message that indicates the message type;

determine whether a destination application is resident in the CMU or other computer onboard the aircraft based on the message type;

format the ACARS uplink message based on the location of the destination application: CMU or other computer on the aircraft;

when the ACARS uplink message is intended for other computer on the aircraft, update a field indicating the message type in the formatted ACARS uplink message; and deliver the updated ACARS uplink message to the destination application onboard the aircraft.

20. The computer program product of claim 19, wherein causing the processor to update the field comprises causing the processor to update one of (1) a message function indicator (MFI) field or (2) characters in selected positions in a data field of the formatted ACARS uplink message.

* * * * *